Dec. 28, 1954 P. O. ENGELDER 2,697,942
DEVICE FOR MEASURING VELOCITY OF FLOW OF FLUID IN WELLS
Filed Dec. 17, 1951
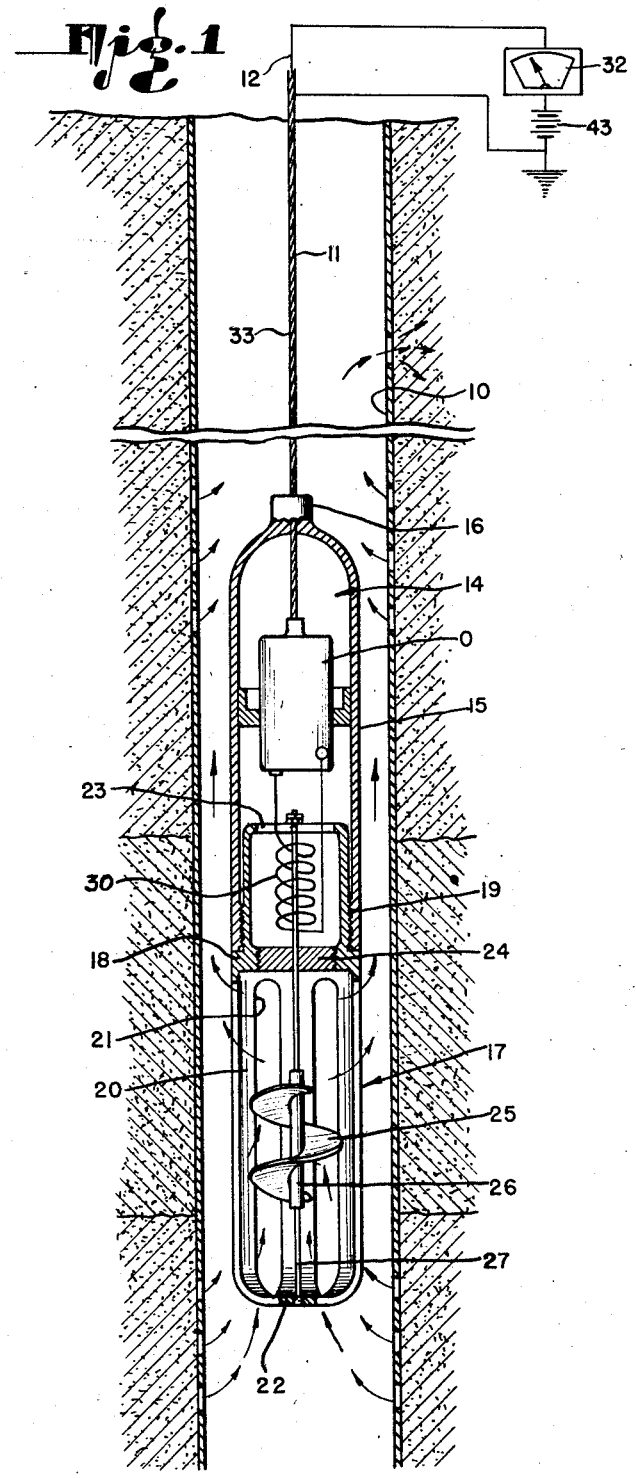
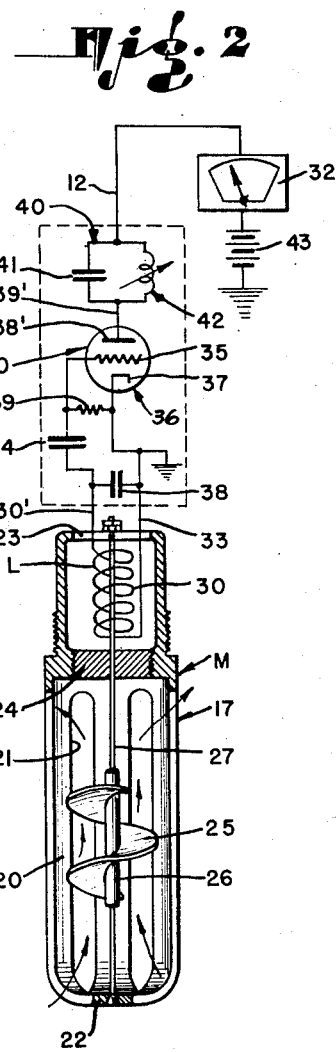
INVENTOR.
PAUL O. ENGELDER
BY
ATTORNEY

United States Patent Office 2,697,942
Patented Dec. 28, 1954

2,697,942

DEVICE FOR MEASURING VELOCITY OF FLOW OF FLUID IN WELLS

Paul O. Engelder, Long Beach, Calif., assignor to Oil Well Water Locating Co., Long Beach, Calif., a corporation of California Application December 17, 1951, Serial No. 262,067

7 Claims. (Cl. 73—155)

My invention relates to a device for the accurate measurement of fluid velocity in bore holes, such as oil wells, and relates in particular to a device of this character which responds to and indicates small differences in velocity.

The value of accurate measurement of velocity of fluids in bore holes has been contemplated as a means for determining points of entry and egress of fluid into and from a well and also as a means for ascertaining the quantity of fluid entering the well at different levels. In a producing well, the velocity of fluid in the well bore varies with the value of $q/t$, where $q$ equals the quantity of fluid which has entered the well and $t$ represents the adopted unit of time. In the petroleum producing industry, this value is ordinarily referred to as barrels per minute or day. If a series of measurements are taken, starting at the bottom of the well, providing there is no change in well diameter, each increase in velocity noted by the measuring instrument, as it is moved upwardly in the well bore, indicates an entry of fluid from the formation into the well, and each decrease in the velocity indicates that fluid is flowing from the well bore into the formation. Having knowledge of the diameter of the well bore, it is possible, by computation, to determine the value $q/t$ at each point of entry or egress.

A number of attempts have been made to provide a device for suitably measuring the velocity of a column of fluid in a bore hole. A number of such devices have been patented, but have not been found sufficiently sensitive to small values of velocity. As understood, each of the prior art devices has a primary measuring element which is set in motion by the moving fluid. Friction and the necessity of overcoming inertia of the system have made accurate and fine measurements impossible. For example, in some of the devices it requires a velocity of 3 feet per minute to overcome the static friction of the moving parts of the device, and then it is not possible to register changes in velocity of less than 1 foot per minute. When it is considered that a well, having a casing of 6⅝ inches in diameter, which is an average size, must produce at the rate of 144 barrels per day to start motion of the moving parts of the device and changes in rates of flow less than 48 barrels per day cannot be measured, it may be readily perceived why devices of the prior art, such as referred to in the foregoing, fail to serve their intended purpose.

It is an object of the present invention to provide an apparatus for measuring velocity of fluid in a well bore which avoids friction between moving parts and also avoids continuous movement of parts. The invention provides a device which is very sensitive and is capable of measuring extremely low velocities and also small changes in velocity in a well bore.

It is a further object of the invention to provide an apparatus for measuring the velocity of fluid in a well bore wherein motion of the fluid creates a stress in an element which varies as the velocity of the fluid changes, and which stress is measured and indicated at the top of the well so as to make known to an observer the velocity of fluid relative to the device in the well.

It is a further object of the invention to provide an apparatus for measuring the velocity of fluid in a bore hole wherein relative movement of fluid varies the reluctance of a magnetic flux path or circuit, and wherein this change in reluctance is measured, the measurements thus obtained providing indications on fluid velocities encountered by the sensitive element which is lowered into the well.

A further object of the invention is to provide an apparatus for measuring fluid velocities in a bore hole wherein a vane is exposed to the fluid and is deflected through relatively minute distances as the fluid velocity changes, and wherein the deflection of this vane varies the reluctance of an element in a magnetic flux circuit, there being means responsive to variations in the reluctance of the magnetic flux circuit to indicate deflection of the vane and likewise indicate velocity of fluid causing deflection.

Further objects and advantages of the invention will be brought out in the following part of the specification wherein I have described a preferred embodiment of my invention in detail for the purpose of complete disclosure, without limiting the scope of the invention set forth in the appended claims.

Referring to the drawing which is for illustrative purposes only,

Fig. 1 is a schematic view showing a preferred embodiment of my invention in use in a well bore; and Fig. 2 is a simple electrical diagram of the basic elements of a device made in accordance with the teachings of my invention.

According to my invention, I lower into a well bore 10, by means of a cable 11 having therein an insulated electrical conductor 12, an instrument 14 provided with a hollow, vertically elongated cylindrical body 15 having a cable socket 16, at its upper end whereby means, such as a cable socket 16, at its upper end whereby it may be connected to the lower end of the cable 11. A cage 17 is secured to the lower end of the hollow body 15, this cage comprising an upper wall portion 18 of substantially cylindric form having threads 19 whereby it is screwed into the lower end of the hollow body 15. The cage 17 includes relatively slender bars 20 defining a plurality of vertically extended openings 21. The lower ends of the bar 20 curve toward each other and are joined by a middle section 22.

At the upper extremity of cage 17 there is a bar 23, disposed transversely. This bar, or bridge 23, is disposed at the upper end of the cylindrical wall portion 18 of the cage member 17, and is disposed within the lower portion of the hollow body 15. A wall 24, of nonmagnetic material, is disposed within the lower part of the cylindrical portion 18 and provides a fluid tight closure for the lower end of the hollow body 15. Within the cage 17 there is a vane member 25, supported so that it will be deflected by fluid which passes through the interior space of the cage 17. The vane member 25 is resiliently supported, and the extent to which it is deflected varies with the forces applied to the vane by fluid moving at different velocities. In the embodiment of the invention shown, the vane 25 is of helical form and includes an axial tube portion 26 which is fixed on a slender shaft 27 which extends vertically within the cage 17 from the metal section 22, through the fluid barrier or transverse wall 24 to the bridge 23. Deflection of the vane member, which deflection is principally rotary or torsional, is transmitted to the shaft 27, producing slight changes in position or form of at least a portion of the shaft 27. Means are provided within the hollow body 15 responsive to these changes in the shaft 27, as a measure of the deflection of the vane member 25.

In the form of the invention disclosed, the entire shaft 27 is formed from magnetostrictive material, and therefore varies in permeability as a result of strain and deformation applied thereto by the vane, when the vane is deflected. The entire cage member 17, that is to say, the parts 18, 20, 22 and 23, are made from a metal of high permeability, and cooperates with the shaft 27 in forming a closed magnetic flux path for circuit. A coil 30 of electrical conductor is disposed around the upper portion of the shaft 27 between the bridge 23 and the closure wall 24 so as to form, in connection with the members forming the magnetic flux circuit a variable inductance L.

The reluctance of the magnetic circuit M is a function of the stress applied to the shaft 27. Since this reluctance is changed by stress in any portion of the shaft 27, the friction of the fluid seal where the shaft passes through the closure wall 24 does not affect the result. That is to say, the shaft 27 may be fixed in the wall 24 so that only that portion of the shaft 27 below the wall 24 is stressed as a result of deflection of the vane 17. The change in the effective permeability of the member 27 is measured as an indication of the deflection of the vane 17. The way I propose to do this is by incorporating the inductance L in the grid circuit of a tuned-plate, tuned-grid oscillator O. A meter 32 in the plate circuit of the oscillator O measures the plate current of the oscillator, which plate current is a function of the departure of one of the two tuned circuits from the resonant frequency of the other.

The conductor 12 is connected to a resonant circuit 40 which is in turn connected to the plate 38' of an electron tube 36, and the ground conductor 33 is connected to the cathode 37 of the tube 36 and one end of the coil 30. The opposite end of the coil 30 is connected through conductor 30' and condenser 34 to the grid 35 of the tube 36. Capacitance connection of the conductors 30' and 33 is accomplished by a condenser 38, and a grid leak 39 is bridged across the grid 35 and the cathode 37. The plate 38' is connected through a conductor 39' with the resonant circuit 40 which has therein a condenser 41 and a variable inductance 42 for tuning the plate circuit. The plate circuit includes in series the meter 32 and a battery 43. By the arrangement shown deflection of the vane 17 produces stress in that portion of the shaft 27 below the closure 24, thereby changing the reluctance of the magnetic flux path and varying the inductance L so as to change the resonance of the grid circuit of the oscillator O. This effects a change in the plate current of the oscillator O, and the indicating element of the meter 32 is moved through distances representative of the velocity of the fluid engaging the vane 17 and causing its deflection.

I claim:

1. In a device for indicating the velocity of a flow of fluid: a vane member adapted to be exposed to the flow of fluid; an element of resilient magnetostrictive material forming the sole means of support of said vane member and being arranged to resist movement of said vane member by said fluid, said element being stressed as the result of movement of said vane member by said fluid; an inductor comprising an inductance coil having a magnetic field path including at least a portion of said element; and means arranged to measure the changes in the inductance of said inductor as said element is stressed by movement of said vane member.

2. In a device for indicating the velocity of a flow of fluid in a bore hole: an organization adapted to be lowered into the well, said organization comprising a slender magnetostrictive element of resilient material supported longitudinally in said organization at spaced points, a spiral vane mounted on said element and being exposed to a flow of fluid in the bore hole so that movement of said vane by said fluid will torsionally stress said element; electrical means responsive to changes in reluctance in said element to vary an electrical value; and means at the surface of the ground receiving at least a portion of said electrical value and indicating the same as a measure of said velocity of said flow of fluid.

3. In a device for indicating the velocity of a flow of fluid in a bore hole: an organization adapted to be lowered into the well, said organization comprising a slender magnetostrictive element of resilient material supported longitudinally in said organization at spaced points, a spiral vane mounted on said element and being exposed to a flow of fluid in the bore hole so that movement of said vane by said fluid will torsionally stress said element; electrical means responsive to changes in reluctance in said element to vary an electrical value, said electric means comprising a tuned-plate, tuned-grid oscillator having in one of its tuned circuits an inductor comprising a coil surrounding a portion of said element so that said element forms a part of the magnetic field path of the inductor; and means at the surface of the ground receiving at least a portion of said electrical value and indicating the same as a measure of said velocity of said flow of fluid.

4. In a device for indicating the velocity of a flow of fluid: a vane member adapted to be exposed to the flow of fluid; metal members arranged to form a magnetic flux path, one of said members being of resilient magnetostrictive material forming the sole means of support of said vane member and being arranged to resist movement of said vane member by said fluid, said member of magnetostrictive material being stressed as the result of movement of said vane member by said fluid; a coil arranged so that it will be intersected by at least a portion of the magnetic flux which flows in said magnetic flux path; and means for measuring changes in the inductance of said coil as the flux in said path is varied in response to changes in stress in said magnetostrictive member by said vane, thereby indicating changes in fluid velocity.

5. In a device for indicating the velocity of a flow of fluid: a vane member adapted to be exposed to the flow of fluid; metal members arranged to form a magnetic flux path, one of said members being of resilient magnetostrictive material forming the sole means of support of said vane member and being arranged to resist movement of said vane member by said fluid, said member of magnetostrictive material being stressed as the result of movement of said vane member by said fluid; a coil arranged so that it will be intersected by at least a portion of the magnetic flux which flows in said magnetic flux path; means for passing a flow of oscillating current through said coil; and means for measuring changes in said oscillating current as the flux in said path is varied in response to changes in stress in said magnetostrictive member by said vane, thereby indicating changes in fluid velocity.

6. In a device for indicating the velocity of a flow of fluid in a bore hole: a shell arranged to be lowered into the bore hole having wall of non-magnetic material; metal means forming a path of flow of magnetic flux extending through said wall, said means having an internal portion inside said shell and an external portion outside said shell, at least said outer portion being of magnetostrictive material; a vane exposed to the flow of fluid in the bore hole and being connected to said external portion of said means so that movement of said vane by said flow of fluid will stress at least said external portion of said means; a coil contiguous to said internal portion; means for passing a flow of oscillating current through said coil; and means for indicating changes in said oscillating current as an indication of changes in velocity of the flow of fluid to which said vane is exposed.

7. In a device for indicating the velocity of a flow of fluid in a bore hole: a shell arranged to be lowered into the bore hole having a transverse wall of non-magnetic material; metal means forming a path of flow of magnetic flux extending through said wall, said means having an internal portion inside said shell and an external portion outside said shell, at least said outer portion being of magnetostrictive material; a spiral vane mounted on said external portion of said means and being exposed to the flow of fluid in the bore hole so that movement of said vane by said flow of fluid will stress at least said external portion of said means; a coil contiguous to said internal portion; means for passing a flow of oscillating current through said coil; and means for indicating changes in said oscillating current as an indication of changes in velocity of the flow of fluid to which said vane is exposed.

References Cited in the file of this patent

UNITED STATES PATENTS

| Number | Name | Date |
| --- | --- | --- |
| 2,173,382 | West | Sept. 19, 1939 |
| 2,511,178 | Roters | June 13, 1950 |
| 2,607,221 | Babson et al. | Aug. 19, 1952 |

FOREIGN PATENTS

| Number | Country | Date |
| --- | --- | --- |
| 631,973 | Great Britain | Nov. 14, 1949 |